United States Patent
Funabiki (10) Patent No.: US 6,716,555 B2
(45) Date of Patent: Apr. 6, 2004

(54) POSITIVE ACTIVE MATERIAL FOR SECONDARY BATTERY, PROCESS FOR PREPARATION THEREOF AND NON-AQUEOUS SECONDARY BATTERY COMPRISING SAME

(75) Inventor: Atsushi Funabiki, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 350 days.

(21) Appl. No.: 09/878,203

(22) Filed: Jun. 12, 2001

(65) Prior Publication Data

US 2002/0009642 A1 Jan. 24, 2002

(30) Foreign Application Priority Data

Jun. 13, 2000 (JP) .................................... P.2000-177431
Apr. 10, 2001 (JP) .................................... P.2001-111906

(51) Int. Cl.⁷ ............................................... H01M 4/36
(52) U.S. Cl. ................. 429/221; 429/231.5; 429/231.9; 423/62; 423/138; 423/593; 423/594; 423/632; 423/633
(58) Field of Search .................... 429/231.5, 231.9, 429/221; 423/62, 593, 594, 632, 633, 138

(56) References Cited

U.S. PATENT DOCUMENTS

| | | | |
|---|---|---|---|
| 5,336,572 A | | 8/1994 | Koksbang |
| 5,340,671 A | * | 8/1994 | Koksbang ................ 429/218.1 |
| 5,358,801 A | * | 10/1994 | Brodd ........................ 429/215 |
| 5,389,472 A | * | 2/1995 | Takeuchi et al. ............ 429/219 |
| 5,567,548 A | * | 10/1996 | Walk et al. ............... 429/231.2 |
| 5,686,203 A | * | 11/1997 | Idota et al. .................. 429/342 |
| 5,698,338 A | * | 12/1997 | Barker et al. ................ 429/223 |
| 5,700,598 A | * | 12/1997 | Denis et al. .............. 429/231.2 |
| 6,004,697 A | * | 12/1999 | Thackeray et al. .......... 429/223 |
| 6,013,391 A | * | 1/2000 | Le et al. .................. 429/231.2 |
| 6,083,474 A | | 7/2000 | Nakamura et al. |
| 6,174,623 B1 | * | 1/2001 | Shackle ................... 429/218.1 |
| 6,270,925 B1 | | 8/2001 | Takada et al. |
| 6,503,646 B1 | * | 1/2003 | Ghantous et al. .............. 429/3 |
| 6,555,272 B2 | * | 4/2003 | Suzuki et al. ............ 429/231.8 |
| 2002/0192152 A1 | | 12/2002 | Funabiki et al. |

FOREIGN PATENT DOCUMENTS

| | | |
|---|---|---|
| EP | 0 837 037 A1 | 4/1998 |
| JP | 10-233212 A | 9/1998 |
| JP | 10-233215 A | 9/1998 |

OTHER PUBLICATIONS

Masatoshi Hayashibara et al., Lithiation Characteristics of $FeVO_4$, Solid State Ionics 98 (1997), pp. 119–125 No month available.

M.Y. Saidi et al., Investigation of the Electrochemical Properties of $Fe_xV_2O_5$, Solid State Ionics 82 (1995), pp. 203–207 No month available.

XP–001023024, Michio Sugawara et al., Amorphous Iron Orthovanadate ($FeVO_4$) as Cathode Active Materials for Rechargeable Lithium Cells, pp. 224–227, Jul. 3, 1992.

European Search Report dated Sep. 10, 2001.

K. Amine, H. Yasuda, and M. Yamachi, β–FeOOH, a new positive electrode material for lithium secondary batteries, Journal of Power Sources, vol. 81–82, pp. 221–223, published Sep. 1999.

P. Poizot, E. Baudrin, S. Laruelle, L. Dupont, M. Touboul, J.–M, Taracon, Low Temperature Synthesis and Electrochemical Performance of Crystallized $FeVO_4 \cdot 1.1H_2O$, Solid State Ionics, 138, pp. 31–40, Dec. 2000.

* cited by examiner

*Primary Examiner*—Bruce F. Bell
(74) *Attorney, Agent, or Firm*—Sughrue Mion, PLLC (57) ABSTRACT

The positive active material for secondary battery according to the invention comprises O, Fe in an amount of higher than 25% by weight, and V in an amount of from higher than 0% by weight to less than 35% by weight. The positive active material, when it is free of lithium, exhibits the following main peaks by the X-ray diffractometry using CuKα rays: a peak within a 2θ range of from greater than 26° to less than 29° and a peak within a 2θ range of from greater than 29° to less than 32°. The non-aqueous secondary battery having a positive electrode comprising this positive active material exhibits a high capacity and good cycle life performance and is inexpensive and environmentally friendly.

11 Claims, 5 Drawing Sheets

FIG.7

POSITIVE ACTIVE MATERIAL FOR SECONDARY BATTERY, PROCESS FOR PREPARATION THEREOF AND NON-AQUEOUS SECONDARY BATTERY COMPRISING SAME

FIELD OF THE INVENTION

The present invention relates to a positive active material for secondary battery, a process for the preparation thereof and a non-aqueous secondary battery comprising such a positive active material.

BACKGROUND ART

As a small-sized power supply for cellular phone, video camera, etc., or large-sized power supply for electric vehicle and large-sized power supply for load-leveling of electric power, a non-aqueous secondary battery having a high energy density and a high output density attracts much attention in recent years. This non-aqueous secondary battery uses a lithium-transition metal oxide as a positive active material, and graphite, an amorphous carbon, an oxide, a lithium alloy or metallic lithium as a negative active material. However, the lithium-transition metal oxide to be used as a positive active material, e.g., lithium cobaltate ($LiCoO_2$) is expensive. Accordingly, in order to cope with the consumption of a huge amount of non-aqueous secondary batteries which is expected to occur in the future, it is important to develop positive active materials which are inexpensive and can be prepared from abundant materials. Oxides containing manganese, nickel or iron are now under extensive studies as a positive active material for non-aqueous secondary battery. Among these materials, iron is a material which is most inexpensive and environmentally friendly. Thus, iron-based compounds are very attractive as a next-generation positive active material for non-aqueous secondary battery.

As a positive active material for non-aqueous secondary battery, there have been studied and reported various iron-based compounds. In particular, vanadium-iron composite oxides such as $Fe_{0.12}V_2O_{5.16}$ (J. Power Sources, 54, 342 (1995)) and amorphous $FeVO_4$ (DENKI KAGAKU, 61, 224 (1993)) have higher discharge capacity than other iron-based oxides such as $LiFeO_2$ (J. Electrochem. Soc., 143, 2435 (1996)), $LiFePO_4$ (J. Electrochem. Soc., 144, 1609 (1997)), and $\beta$-FeOOH (J. Power Sources, 81–82, 221 (1999)), and thus have attracted attention as a next-generation positive active material.

However, vanadium is highly toxic as compared with iron. Thus, the content of vanadium, if used in the form of vanadium-iron composite oxide as a positive active material, is preferably controlled as low as possible. From this standpoint of view, among vanadium-iron composite oxides which have heretofore been reported, amorphous $FeVO_4$, which has a relatively less vanadium content, is preferable as a positive active material for secondary battery.

However, M. Sugawara et al. reported that when amorphous $FeVO_4$ is used as a positive active material for non-aqueous secondary battery, the resulting battery shows a discharge capacity drop to the level of 80% of the initial value at 5th cycle (DENKI KAGAKU, 61, 224 (1993)). In other words, amorphous $FeVO_4$ has disadvantage that it has poor cycle life performance. Accordingly, no vanadium-iron composite oxides which have a high capacity, good cycle life performance and a low vanadium content have been heretofore found.

It is therefore an object of the present invention to provide a secondary battery which exhibits a high capacity and good cycle life performance and is inexpensive and environmentally friendly.

SUMMARY OF THE INVENTION

The positive active material for secondary battery according to the invention comprises O, Fe in an amount of higher than 25% by weight (based on the total weight of the positive active material), and V in an amount of from higher than 4% by weight to less than 35% by weight (based on the total weight of the positive active material). The content of Fe is preferably higher than 33% by weight (based on the total weight of the positive active material). Further, the content of V is preferably less than 30% by weight (based on the total weight of the positive active material). By controlling the content of Fe to be higher than 33% by weight (based on the total weight of the positive active material) and the content of V to be less than 30% by weight (based on the total weight of the positive active material), the positive active material according to the invention can be more environmentally friendly than the conventional active materials.

Further, the positive active material of the invention, when free of lithium (i.e., before charge and discharge), shows the following main diffraction peaks when subjected to X-ray analysis using $CuK\alpha$ rays: a peak within a $2\theta$ range of from greater than 26° to less than 29° ($26° < 2\theta < 29°$) and a peak within a $2\theta$ range of from greater than 29° to less than 32° ($29° < 2\theta < 32°$). The term "main diffraction peak" as used herein is meant to indicate the strongest and the second strongest diffraction peaks.

The positive active material of the invention which has been subjected to charge and discharge shows a changed crystal structure and at least the following diffraction peaks when subjected to X-ray analysis using $CuK\alpha$ rays: a peak within a $2\theta$ range of from greater than 18° to less than 20° ($18° < 2\theta < 20°$), a peak within a $2\theta$ range of from greater than 21° to less than 23° ($21° < 2\theta < 23°$), a peak within a $2\theta$ range of from greater than 25° to less than 27° ($25° < 2\theta < 27°$) and a peak within a $2\theta$ range of from greater than 31° to less than 33° ($31° < 2\theta < 33°$). The positive active material of the invention after charged to 4.3 V vs. $Li/Li^+$ shows these four main diffraction peaks at these four $2\theta$ ranges, respectively, when subjected to X-ray analysis using $CuK\alpha$ rays within a $2\theta$ range of from greater than 18° to less than 70° ($18° < 2\theta < 70°$). The term "main diffraction peak" as used herein is meant to indicate the strongest, the second, the third, and the fourth strongest peaks.

The positive active material of the invention is prepared by a process which comprises heating an aqueous solution wherein iron(III) chloride ($FeCl_3$) and a vanadium salt are together dissolved therein at a temperature of from 40° C. to 100° C. for hydrolysis. This preparation process is as extremely simple as comprising a step of dissolving iron(III) chloride and a vanadium salt in water, and the step of heating the resulting aqueous solution at a temperature of from 40° C. to 100° C., and thus is extremely excellent as an industrial mass production process.

In this preparation process, it is preferred that the vanadium salt be $VOSO_4$ and that an aqueous solution having $FeCl_3$ and $VOSO_4$ dissolved therein at a molar ratio of higher than 0.034 be used (i.e., $0.034 < (VOSO_4/FeCl_3)$). The purpose of this arrangement is to prevent possible by-production of $\beta$-FeOOH having much lower discharge capacity than the active material of the present invention.

The non-aqueous secondary battery comprising a positive electrode containing a positive active material of the present invention exhibits a high capacity and good cycle life performance and is inexpensive and environmentally friendly.

BRIEF DESCRIPTION OF THE DRAWINGS

FIG. 7 is a diagram illustrating the X-ray diffraction pattern of the positive active material used in the battery A2 of an example according to the invention (a) in the charged state, (b) in the discharged state, and (c) before charged and discharged. In FIG. 7, the symbol * indicates a diffraction peak which has newly appeared upon charge/discharge.

DETAILED DESCRIPTION OF THE INVENTION

The embodiment of the present invention will be further described hereinafter.

The positive active material according to the invention comprises Fe, V, and O. When X and Y are the content of Fe and V (% by weight based on the total weight of the positive active material), respectively, X and Y satisfy the relationships $25<X$ and $4<Y<35$. The content of Fe is preferably higher than 33% by weight ($33<X$). Further, the content of V is preferably less than 30% by weight ($4<Y<30$). By controlling the content of Fe to be higher than 33% by weight and the content of V to be less than 30% by weight, the positive active material of the invention can be more environmentally friendly than the conventional active materials such as amorphous $FeVO_4$ in which the content of Fe and V is 33% and 30% by weight, respectively. Furthermore, by controlling the content of V to be higher than 4% by weight, the discharge capacity of the positive active material of the invention can be made to be much higher than the capacity of the positive active material in which the content of V is 4% or less. The content of V is not specifically limited in the range of from higher than 4% to less than 30% by weight. In practice, however, the content of V is preferably higher than 20% by weight to obtain higher discharge capacity.

The positive active material of the invention, which is free of lithium, shows the following main diffraction peaks when subjected to X-ray diffraction using $CuK\alpha$ rays: a peak within a diffraction angle ($2\theta$) range of from greater than 26° to less than 29° ($26°<2\theta<29°$) and a peak within a $2\theta$ range of from greater than 29° to less than 32° ($29°<2\theta<32°$). A definite diffraction peak appears at each angle. The term "main diffraction peak" as used herein is meant to indicate the strongest and the second strongest diffraction peaks.

When the positive active material of the invention is applied to a non-aqueous secondary battery, the intercalation/deintercalation of lithium is accompanied by the decrease in the crystallinity of the active material and the change of the crystalline structure. The change of the crystalline structure can be confirmed by X-ray diffractometry. For example, the positive active material of the invention which has been subjected to charge-discharge test shows at least the following diffraction peaks when subjected to X-ray diffractometry using $CuK\alpha$ rays: a peak within a $2\theta$ range of from greater than 18° to less than 20° ($18°<2\theta<20°$), a peak within a $2\theta$ range of from greater than 21° to less than 23° ($21°<2\theta<23°$), a peak within a $2\theta$ range of from greater than 25° to less than 27° ($25°<2\theta<27°$), and a peak within a $2\theta$ range of from greater than 31° to less than 33° ($31°<2\theta<33°$). The positive active material of the invention after charged to 4.3 V vs. $Li/Li^+$ shows these four main diffraction peaks, respectively, at these four $2\theta$ ranges when subjected to X-ray analysis using $CuK\alpha$ rays within a $2\theta$ range of from greater than 18° to less than 70° ($18°<2\theta<70°$). The term "main diffraction peak" as used herein is meant to indicate the strongest, the second, the third, and the fourth strongest peaks. On the other hand, in addition to those peaks, the positive active material of the invention after discharged to 1.6 V vs. $Li/Li^+$ shows the following other diffraction peaks: a peak within a $2\theta$ range of from greater than 42° to less than 44° ($42°<2\theta<44°$) and a peak within a $2\theta$ range of from greater than 62° to less than 64° ($62°<2\theta<64°$). The intensity of these two peaks greatly changes and its change is reversible upon charge and discharge.

The positive active material of the invention can be obtained by heating an aqueous solution comprising iron(III) chloride and a vanadium salt (i.e., an aqueous solution wherein iron(III) chloride and a vanadium salt are together dissolved therein) at a temperature of from 40° C. to 100° for hydrolysis. At the hydrolysis process, iron(III) chloride and a vanadium salt are together dissolved in water, and then the resulting aqueous solution is heated to a temperature of from 40° C. to 100° C. The heating rate is not specifically limited. In practice, however, the heating rate is as low as about 10° C./hr. The aqueous solution which has been hydrolyzed is preferably subjected to aging for 1 day or longer before filtration, rinsing and drying. This preparation process is extremely simple and thus is very excellent as a mass production process.

As the iron(III) chloride to be used in the preparation of the positive active material of the invention, either anhydride or hydrate of iron(III) chloride may be used. Examples of the vanadium salt employable herein include $V_2O_3$, $V_2O_4$, $V_2O_5$, $NH_4VO_3$, $VOCl_3$, $VOSO_4$, and mixtures thereof. Similarly, these vanadium salts may be used in the form of anhydride or hydrate.

In the foregoing preparation process, if $VOSO_4$ is used as a vanadium salt, by predetermining the mixing molar ratio of $VOSO_4$ to iron(III) chloride to be higher than 0.034 (i.e., $0.034<(VOSO_4/FeCl_3)$), the positive active material of the invention can be obtained. When the molar ratio of the vanadium salt to iron(III) chloride falls below the above defined range, $\beta$-FeOOH is by-produced.

The positive active material of the invention may or may not contain water. In particular, the amount of water, if any, is preferably as low as possible. This is because the lower the water content is, the better is the cycle life performance of the active material. An example of the process for the preparation of the positive active material of the invention having a low water content is a process which comprises calcining at a temperature of from 100° C. to 300° C. in an inert atmosphere the active material of the invention prepared by the foregoing preparation process.

The non-aqueous secondary battery having the positive active material of the invention shows the average potential between 2.1 V and 2.5 V vs. Li/Li$^+$. Here, the average potential is the potential which corresponds to the half of the maximum discharge capacity obtained from the charge-discharge test which is carried out between P1 (lower cut-off potential) and P2 (upper cut-off potential) where $1.5 \leq P1 < 2.0$ and $4.0 < P2 \leq 4.5$. Each value of the potential is based on that of the redox potential of Li/Li$^+$.

Figure 1:
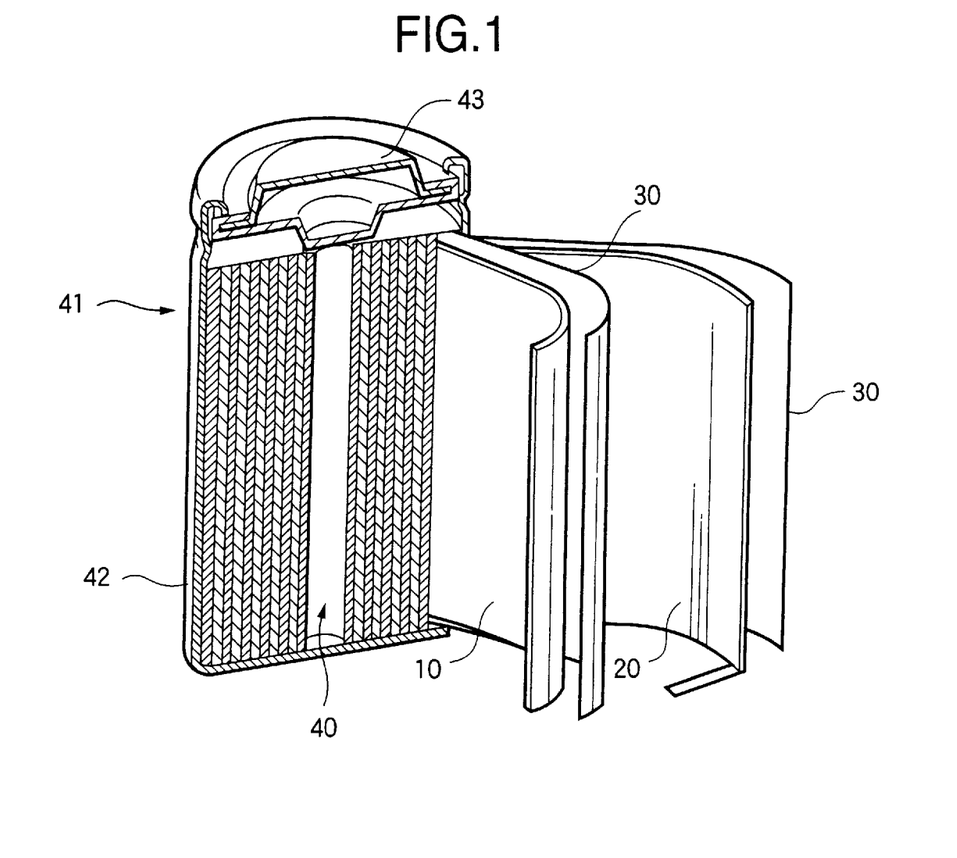
FIG. 1 is an exploded perspective view illustrating a non-aqueous secondary battery.
Figure 2:
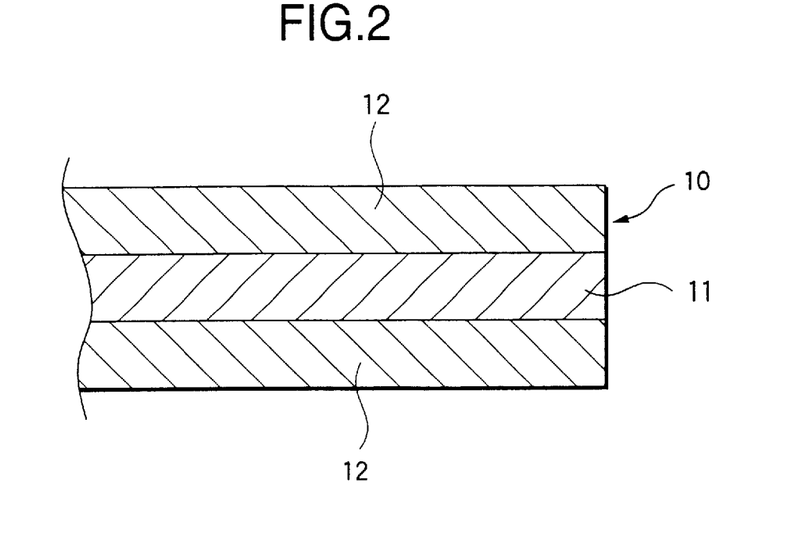
FIG. 2 is an enlarged sectional view illustrating a positive electrode.
Figure 3:
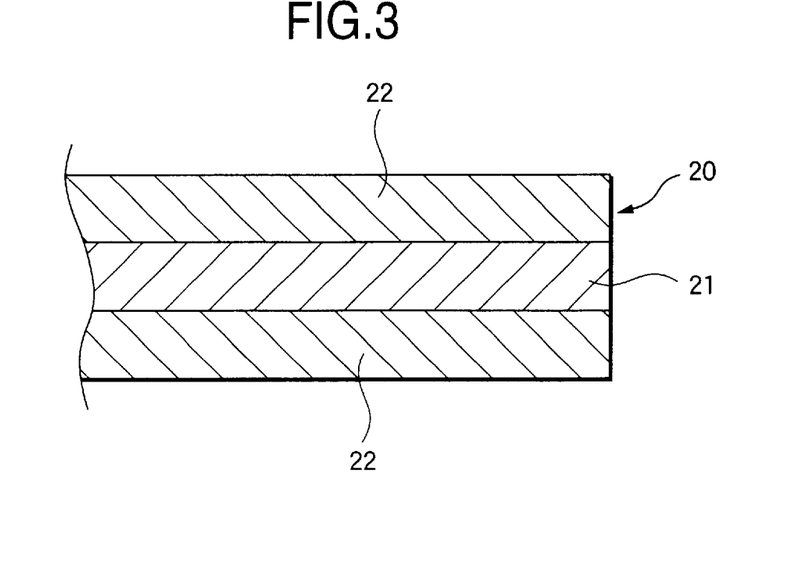
FIG. 3 is an enlarged sectional view illustrating a negative electrode.

In the case where the positive active material of the invention is used to form a non-aqueous secondary battery, a battery structure as shown in FIGS. 1 to 3 may be employed. In some detail, a positive electrode 10 and a negative electrode 20 are wound with a separator 30 made of, e.g., nonwoven fabric of polyethylene interposed therebetween. The resulting spirally laminated electrode 40 is contained in a battery can 41. The opening of a cylindrical negative case 42 is closed by a positive electrode cap 43. Though not shown, the interior of the battery can is filled with a non-aqueous electrolyte.

As shown in FIG. 2, the foregoing positive electrode 10 comprises a current collector 11 made of, e.g., aluminum foil having a thickness of 20 μm and mixed material 12 comprising a binder, an electrically conducting agent, and a positive active material. The mixed material is retained on both sides of the current collector 11. The positive electrode 10 can be obtained by a process which comprises mixing the positive active material of the invention with a binder, an electrically conducting agent, a solvent such as N-methyl-2-pyrrolidone (NMP) etc., spreading the resulting paste on both sides of the current collector 11, and then drying and rolling the coated material. The positive electrode 10 is cut into a belt having a predetermined width. On the other hand, as shown in FIG. 3, the negative electrode 20 comprises a current collector 21 made of, e.g., copper foil having a thickness of 14 μm and mixed material 22 comprising a binder, an electrically conducting agent, and a negative active material. The mixed material is retained on both sides of the current collector 21. The negative electrode 20 can be obtained by a process which comprises mixing a negative active material with a binder, a solvent such as NMP, etc., spreading the resulting paste on both sides of the current collector 21, and then drying and rolling the coated material. The negative electrode 20 is cut into a belt having a predetermined width. The belt-like positive and negative electrodes are then wound with the foregoing separator 30 interposed therebetween.

As the negative active material to be incorporated in the non-aqueous secondary battery of the invention, there may be used at least one material selected from the group consisting of metallic lithium and a material capable of intercalating/deintercalating lithium ion. Examples of the material capable of intercalating/deintercalating lithium ion include graphite, amorphous carbon, oxide, nitride, and lithium alloy. Examples of the lithium alloy employable herein include lithium-aluminum alloy, lithium-zinc alloy, lithium-bismuth alloy, lithium-cadmium alloy, lithium-antimony alloy, lithium-silicon alloy, lithium-lead alloy, and lithium-tin alloy.

The non-aqueous electrolyte to be used in the non-aqueous secondary battery of the invention may be in the form of non-aqueous electrolytic solution, polymer electrolyte or solid electrolyte. Examples of the solvent to be used in the non-aqueous electrolytic solution include solvents such as ethylene carbonate, propylene carbonate, dimethyl carbonate, diethyl carbonate, methyl ethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofurane, 2-methyltetradhydrofurane, dioxolane and methyl acetate, and mixture thereof.

Examples of the solute to be used in the non-aqueous electrolytic solution include salts such as LiPF$_6$, LiBF$_4$, LiAsF$_6$, LiClO$_4$, LiSCN, LiCF$_3$CO$_2$, LiCF$_3$SO$_3$, LiN(SO$_2$CF$_3$)$_2$, LiN(SO$_2$CF$_2$CF$_3$)$_2$, LiN(COCF$_3$)$_2$ and LiN(COCF$_2$CF$_3$)$_2$, and mixture thereof.

The non-aqueous secondary battery comprising the positive active material of the invention will be further described in the following Examples, but the present invention should not be construed as being limited thereto.

EXAMPLE 1

0.03 mole of FeCl$_3$.6H$_2$O and 0.0032 mole of VOSO$_4$.2H$_2$O were together dissolved in 300 ml of water at a temperature of 25° C. Subsequently, the resulting aqueous solution was heated at a rate as low as about 10° C./hr to a temperature of 80° C., where it was then kept for 2 days. In the course of this aging process, precipitate was obtained. The resulting precipitate was filtered, thoroughly washed with distilled water, and then dried at a temperature of 80° C. to obtain a positive active material according to the invention.

Subsequently, to 75% by weight of the foregoing positive active material were added 20% by weight of acetylene black and 5% by weight of a polyvinylidene fluoride (PVdF). The mixture was then mixed with NMP to obtain a slurry. This slurry was spread on both sides of an aluminum mesh as a current collector, and then dried at a temperature of 80° C. to obtain an electrode. The electrode thus obtained was pressed at a pressure of 1 ton/cm$^2$, and then dried at a temperature of 100° C. in vacuo to prepare a positive electrode having a size of 15 mm×15 mm×0.5 mm.

Finally, the foregoing positive electrode was used to prepare a battery of Example 1 (A1) comprising a positive active material of the invention. As a negative active material, there was used metallic lithium. As a non-aqueous electrolytic solution, there was used a 1:1 (by volume) mixture of ethylene carbonate and dimethyl carbonate wherein 1 mol/l of LiClO$_4$ was dissolved therein. Thus, a flooded type battery was prepared.

EXAMPLE 2

0.03 mole of FeCl$_3$.6H$_2$O and 0.0035 mole of VOSO$_4$.2H$_2$O were together dissolved in 300 ml of water at a temperature of 25° C. Subsequently, the resulting aqueous solution was heated at a rate as low as about 10° C./hr to a temperature of 70° C., where it was then kept for 2 days. In the course of this aging process, precipitate was obtained. The resulting precipitate was filtered, thoroughly washed with distilled water, and then dried at a temperature of 80° C. to obtain a positive active material according to the invention.

A battery of Example 2 (A2) was then prepared in the same manner as in Example 1 except that the positive active material thus obtained was used.

EXAMPLE 3

0.03 mole of FeCl$_3$.6H$_2$O and 0.015 mole of VOSO$_4$.2H$_2$O were together dissolved in 300 ml of water at a temperature of 25° C. Subsequently, the resulting aqueous solution was heated at a rate as low as about 10° C./hr to a temperature of 60° C., where it was then kept for 2 days. In the course of this aging process, precipitate was obtained. The resulting precipitate was filtered, thoroughly washed with distilled water, and then dried at a temperature of 80° C. to obtain a positive active material according to the invention. A battery of Example 3 (A3) was then prepared in the same manner as in Example 1 except that the positive active material thus obtained was used.

EXAMPLE 4

The active material obtained in Example 2 was calcined at a temperature of 200° C. in an atmosphere of argon for 10 hours to obtain a positive active material according to the invention. A battery of the Example 4 (A4) was then prepared in the same manner as in Example 1 except that the positive active material thus obtained was used.

Comparative Example 1

Figure 4:
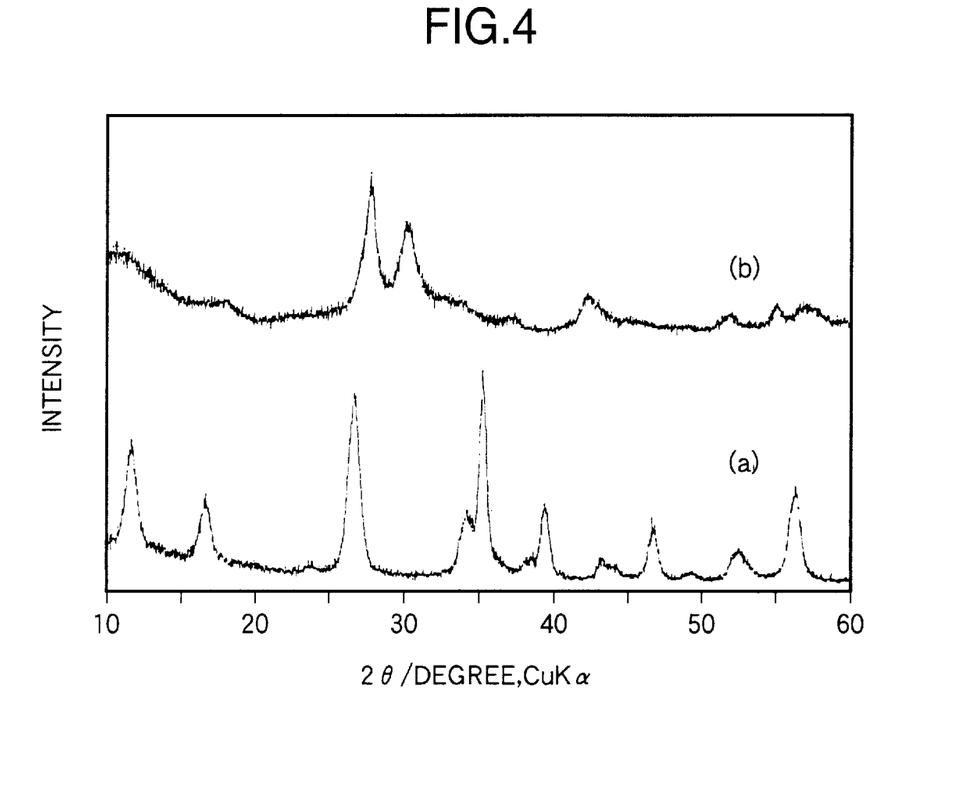
FIG. 4 is a diagram illustrating X-ray diffraction pattern of a positive active material used in (a) the battery B1 of a comparative example, and (b) the battery A1 of an example according to the invention.

0.03 mole of $FeCl_3 \cdot 6H_2O$ and 0.001 mole of $VOSO_4 \cdot 2H_2O$ were together dissolved in 300 ml of water at a temperature of 25° C. Subsequently, the resulting aqueous solution was heated at a rate as low as about 10° C./hr to a temperature of 80° C., where it was then kept for 2 days. In the course of this aging process, precipitate was obtained. The resulting precipitate was filtered, thoroughly washed with distilled water, and then dried at a temperature of 80° C. to obtain a positive active material as a comparative example. A battery of Comparative Example 1 (B1) was then prepared in the same manner as in Example 1 except that the positive active material thus obtained was used. X-ray diffraction pattern of positive active material:

FIGS. 4(a) and (b) illustrate X-ray diffraction patterns (using $CuK\alpha$ rays) of the positive active materials used in the comparative battery B1 and the battery A2 of the invention, respectively. From the position of diffraction peaks shown in FIG. 4(a), it was found that the active material used in the comparative battery B1 is $\beta$-FeOOH. On the other hand, as shown in FIG. 4(b), the crystalline structure of the positive active material used in the battery A2 of the invention was different from that of $\beta$-FeOOH; the positive active material used in the battey A2 of the invention shows definite diffraction peaks at a diffraction angle of about 28° and about 30°. The positive active materials used in the batteries A1, A3, and A4 of the invention showed the same X-ray diffraction patterns as that shown in FIG. 4(b).

Charge-discharge Characteristics

The batteries of the invention and the comparative battery thus prepared were each subjected to a charge-discharge test at a constant current of 0.2 mA/cm². The voltage at which charge and discharge are terminated were 4.3 V vs. $Li/Li^+$ and 1.6 V vs. $Li/Li^+$, respectively. The test was conducted at 25° C. The weight of the positive active material was 10 mg/cm².

Figure 5A:
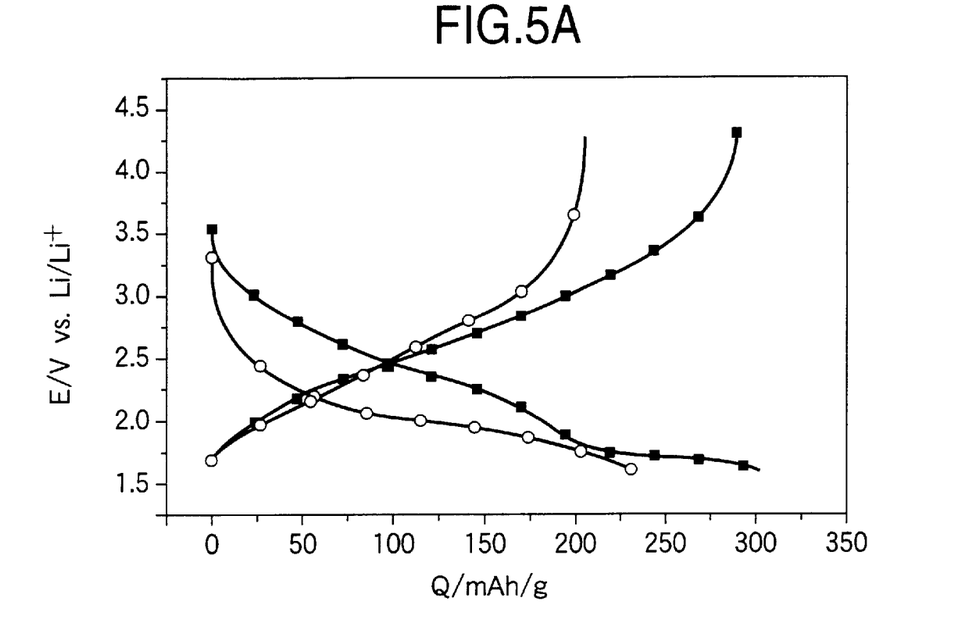
FIGS. 5A and 5B are diagrams illustrating the initial (5A) and the second (5B) charge-discharge characteristics; (■) the battery A1 of an example according to the invention and (○) the battery B1 of a comparative example.
Figure 5B:
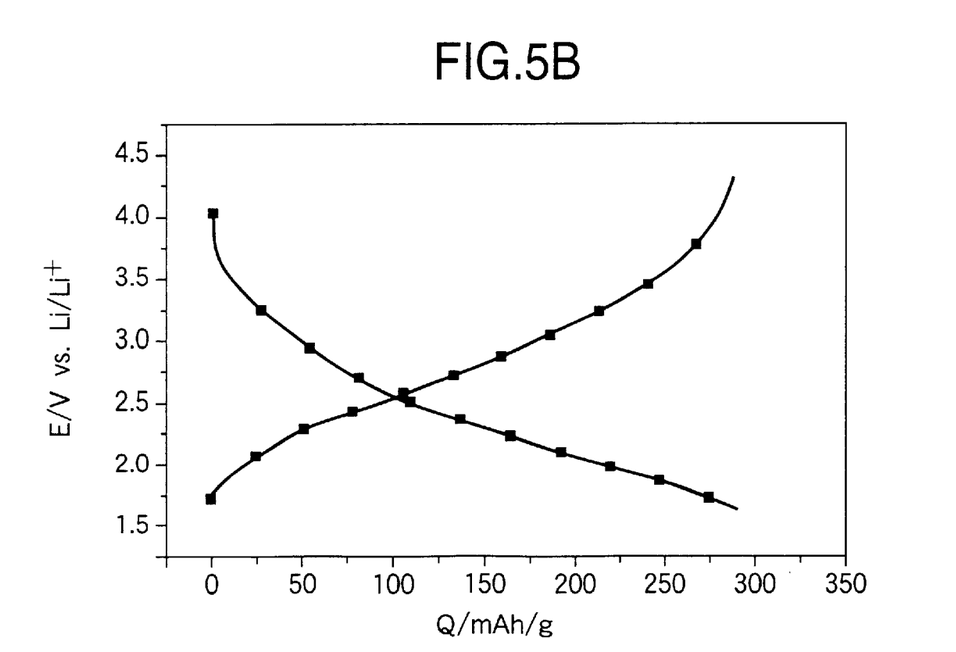

FIG. 5A illustrates the initial charge and discharge curves of the positive active materials used in the battery A2 of the invention and the comparative battery B1. FIG. 5B shows the second charge and discharge curves of the positive active material used in the battery A2 of the invention. In FIGS. 5A and 5B, the symbol ■ indicates the curves of the battery A2 of the invention and the symbol ○ indicates those of the comparative battery B1.

Table 1 shows the mixing molar ratio of $VOSO_4$ to $FeCl_3$ ($VOSO_4/FeCl_3$) used as starting materials in the synthesis of positive active materials, the content of Fe and V in the positive active materials, and the initial discharge capacity per g of positive active materials for the batteries A1, A2, A3, and A4 of the invention and the comparative battery B1.

TABLE 1

| Battery No. | Mixing molar ratio of $VOSO_4$ to $FeCl_3$ used as starting materials in the synthesis of positive active material ($VOSO_4/FeCl_3$) | Content of Fe and V in positive active material (wt %) | | Initial discharge capacity per gram of positive active material (mAh/g) |
| --- | --- | --- | --- | --- |
| | | Fe | V | |
| A1 | 0.11 | 42 | 20 | 273 |
| A2 | 0.12 | 35 | 25 | 305 |
| A3 | 0.50 | 28 | 23 | 314 |
| A4 | 0.12 | 38 | 28 | 294 |
| B1 | 0.033 | 64 | 4 | 234 |

It can be seen in FIGS. 5A and 5B and Table 1, all the batteries of the invention exhibit a far higher discharge capacity than the comparative battery B1. A close look at FIGS. 5A and 5B reveals that the battery of the invention A2 shows a plateau in the initial discharge curve at around 1.8 V vs. $Li/Li^+$. On the other hand, on the subsequent charge and discharge, the battery of the invention A2 exhibits continuous voltage characteristics between 4.3 V and 1.6 V vs. $Li/Li^+$ as shown in FIG. 5B. Further, it is found that the average potential of the battery A2 of the invention is around 2.3 V vs. $Li/Li^+$ which is more positive than the value of around 2.0 V vs. $Li/Li^+$ for the comparative battery B1.

Figure 6:
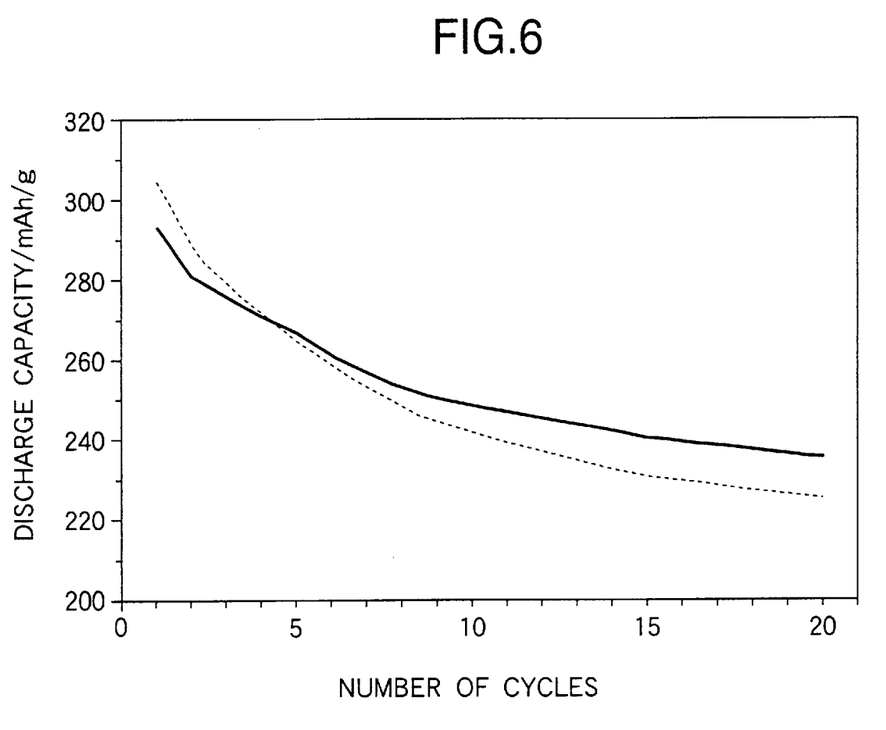
FIG. 6 is a diagram illustrating the relationship between the discharge capacity and number of cycles for the batteries A2 (broken line) and A4 (solid line) of examples according to the invention.

FIG. 6 illustrates the cycle life performance of the positive active materials used in the batteries A2 and A4 of the invention. In FIG. 6, the solid line indicates the cycle life performance of the battery A4 of the invention, and the broken line indicates that of the battery A2 of the invention. It can be seen in FIG. 6 that the battery A4 of the invention exhibits better cycle life performance than the battery A2 of the invention. The positive active material used in the battery A4 of the invention was obtained by calcining the active material used in the battery A2 of the invention in an atmosphere of argon. The active material after calcined showed a weight drop of 14 wt % compared with the material before calcined, but showed no change in X-ray diffraction pattern before and after calcining. Thus, the weight drop corresponds to the decrease of the content of water in the active material. It is thus apparent that the cycle life performance of the positive active material of the invention can be improved by the reduction of water content in the material.

Figure 7:
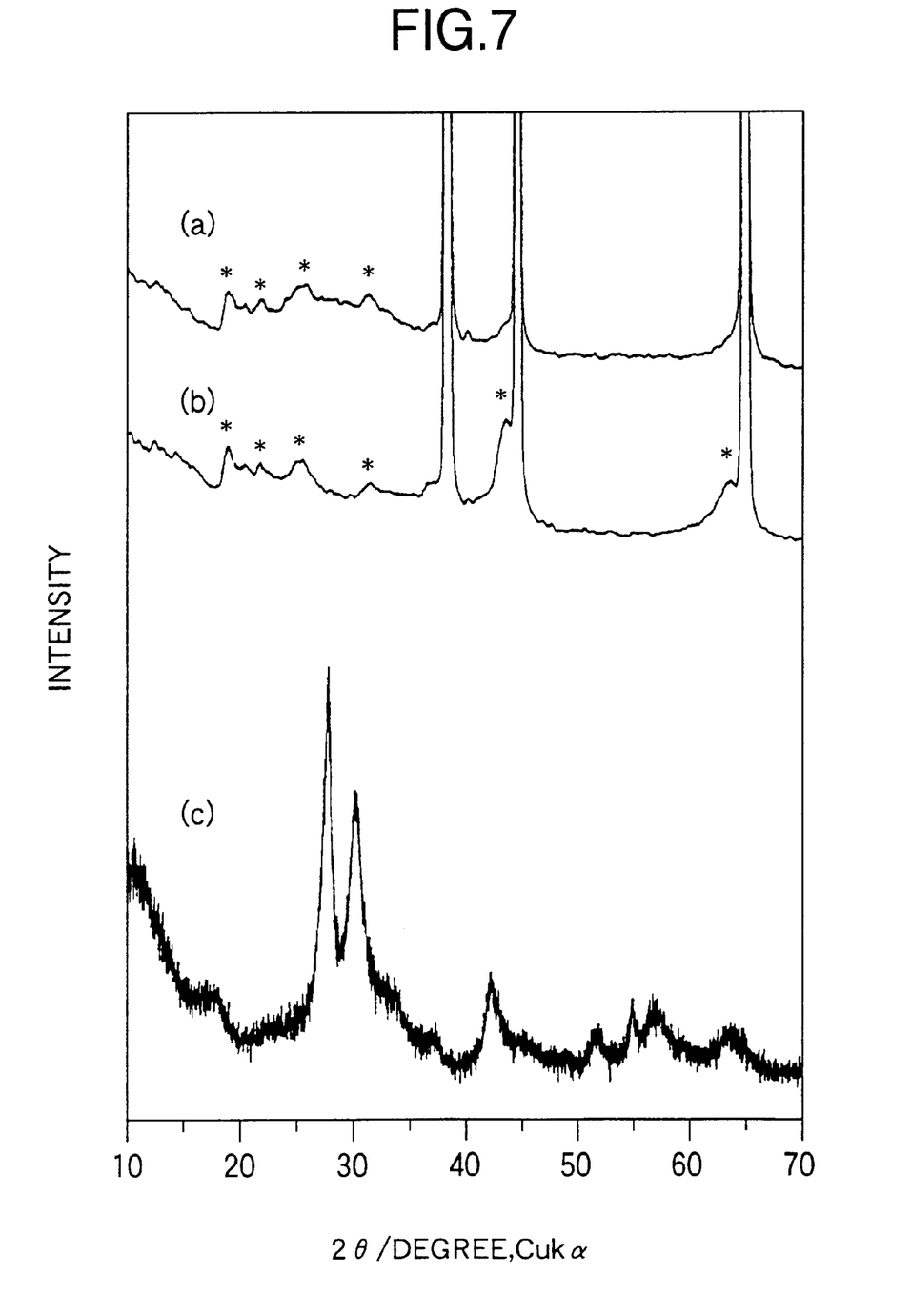

The battery A2 of the invention which had been charged to 4.3 V and the battery A2 of the invention which had been discharged to 1.6 V were each disassembled, and then subjected to X-ray diffractometry of the positive electrode. The X-ray diffraction patterns of the positive electrode in the charged and discharged state are shown in FIGS. 7(a) and (b), respectively. The X-ray diffraction pattern of the active material used in the battery A2 of the invention before being charged and discharged is shown in FIG. 7(c). The comparison of FIGS. 7(a), (b) and (c) shows that when charged and discharged, the active material shows a drastic decrease of the peak intensity, while it shows new diffraction peaks at a diffraction angle of about 19°, 22°, 26° and 32°. It can be seen in FIG. 7(b), which illustrates the X-ray diffraction pattern of the positive electrode in the discharged state, that in addition to those peaks new peaks appear at a diffraction angle of about 43° and 63°. The intensity of these two peaks reversibly changed upon charge and discharge; the intensity of the peaks increased upon discharge and decreased upon charge. It is thus made apparent that the active material of the invention, if used as a positive active material for non-aqueous secondary battery, undergoes lithium intercalation/deintercalation that decreases its crystallinity and that causes a drastic change of its structure.

The positive electrode comprises a positive active material, acetylene black, PVdF, and an aluminum mesh. Since the content of acetylene black and PVdF are low, the X-ray diffraction peak intensity of these materials are far lower than that of the active material. Accordingly, the X-ray diffraction pattern of the positive electrode is mainly attributed to the active material and aluminum mesh. The peaks having a great intensity observed at a diffraction angle of about 38°, 45° and 65° in FIGS. 7(a) and (b) are attributed to the aluminum mesh.

The comparative battery B1 which had been charged to 4.3 V and the battery B1 which had been discharged to 1.6 V were each disassembled, and then subjected to X-ray diffractometry of the positive electrode. The positive electrode in the charged and discharged state showed similar X-ray diffraction patterns as those in FIGS. 7(a) and (b).

It can be seen in Table 1 that the battery A2 of the invention showed much higher discharge capacity than the comparative battery B1. Comparing the content of Fe and V in the positive active material used in the battery A2 of the invention with that in the comparative battery B1, the content of Fe is lower but that of V is higher in the battery A2 of the invention than those in the comparative battery B1. Further, the redox reaction of each element contributes to the discharge capacity of the positive active material. Thus, the higher discharge capacity of the battery A2 of the invention than the comparative battery B1 may be attributed to the higher content of V in the battery A2 of the invention.

In the Examples above, metallic lithium was used as the negative active material. In addition, as the negative active material, there may be also used a lithium-containing nitride such as $Li_{2.6}Co_{0.4}N$. Further, when an active material of the present invention which contains lithium is used as a positive active material, graphite, amorphous carbon, oxide, nitride, metal which can be alloyed with lithium, or the like may be used as a negative active material.

As a process for allowing lithium to be contained in the active material of the invention, there may be used a chemical process or solid-phase process besides the electrochemical process. An example of the chemical process is a process which comprises reacting the active material of the invention with a reducing agent such as n-BuLi and LiI. An example of the solid-phase process is a process which comprises measuring out a lithium salt, an iron salt and a vanadium salt in a predetermined proportion, mixing them, and then calcining the mixture in vacuo or in a reducing atmosphere containing hydrogen.

While the invention has been described in detail and with reference to specific embodiments thereof, it will be apparent to one skilled in the art that various changes and modifications can be made therein without departing from the spirit and scope thereof.

This application is based on Japanese patent applications No. 2000-177431 filed on Jun. 13, 2000 and No. 2001-111906 filed on Apr. 10, 2001, the entire contents thereof being hereby incorporated by reference.

What is claimed is:

1. A positive active material for secondary battery having the following composition:
   O;
   Fe in an amount of higher than 25% by weight; and
   V in an amount of from higher than 4% by weight to less than 35% by weight,
   wherein said positive active material, shows the following main peaks by X-ray diffractometry using CuKα rays:
   a peak within a 2θ range of from greater than 26° to less than 29° and
   a peak within a 2θ range of from greater than 29° to less than 32°.

2. A positive active material for secondary battery having the following composition:
   O;
   Fe in an amount of higher than 25% by weight; and
   V in an amount of higher than 4% by weight to less than 35% by weight,
   wherein said positive active material shows at least the following diffraction peaks by X-ray diffractometry using CuKα rays:
   a peak within a 2θ range of from greater than 18° to less than 20°,
   a peak within a 2θ range of from greater than 21° to less than 23°,
   a peak within a 2θ range of from greater than 25° to less than 27° and
   a peak within a 2θ range of from greater than 31° to less than 33°.

3. A process for the preparation of the positive active material for secondary battery defined in claim 1 or 2, which comprises the step of heating an aqueous solution comprising $FeCl_3$ and a vanadium salt at a temperature of from 40° C. to 100° C. for hydrolysis.

4. A process for the preparation of a positive active material for secondary battery according to claim 3, wherein said vanadium salt is $VOSO_4$ and the molar ratio of $VOSO_4$ to $FeCl_3$ is higher than 0.034.

5. A non-aqueous secondary battery comprising the following elements:
   (1) A negative electrode comprising as a negative active material at least one material selected from the group consisting of metallic lithium and a material capable of intercalating and deintercalating lithium ion;
   (2) A positive electrode comprising a positive active material prepared by a preparation process defined in claim 4; and
   (3) An electrolyte provided in contact with said negative electrode and positive electrode.

6. A non-aqueous secondary battery comprising the following elements:
   (1) A negative electrode comprising as a negative active material at least one material selected from the group consisting of metallic lithium and a material capable of intercalating and deintercalating lithium ion;
   (2) A positive electrode comprising a positive active material prepared by a preparation process defined in claim 3; and
   (3) An electrolyte provided in contact with said negative electrode and positive electrode.

7. A process for the preparation of a positive active material for secondary battery according to claim 1 or 2, which comprises the steps of:
   heating an aqueous solution comprising $FeCl_3$ and a vanadium salt at a temperature of from 40° C. to 100° C. for hydrolysis, collecting the resulting precipitate by filtration, and calcining the resulting product at a temperature of from 100° C. to 300° C. in an inert atmosphere.

8. A process for the preparation of a positive active material for secondary battery according to claim 7, wherein said vanadium salt is $VOSO_4$ and the molar ratio of $VOSO_4$ to $FeCl_3$ is higher than 0.034.

9. A non-aqueous secondary battery comprising the following elements:

(1) A negative electrode comprising as a negative active material at least one material selected from the group consisting of metallic lithium and a material capable of intercalating and deintercalating lithium ion;

(2) A positive electrode comprising a positive active material prepared by a preparation process defined in claim 8; and (3) An electrolyte provided in contact with said negative electrode and positive electrode.

10. A non-aqueous secondary battery comprising the following elements:

(1) A negative electrode comprising as a negative active material at least one material selected from the group consisting of metallic lithium and a material capable of intercalating and deintercalating lithium ion;

(2) A positive electrode comprising a positive active material prepared by a preparation process defined in claim 7; and (3) An electrolyte provided in contact with said negative electrode and positive electrode.

11. A non-aqueous secondary battery comprising:

(1) A negative electrode comprising as a negative active material at least one material selected from the group consisting of metallic lithium and a material capable of intercalating and deintercalating lithium ion;

(2) A positive electrode comprising a positive active material defined in claim 1 or 2; and (3) An electrolyte provided in contact with said negative electrode and positive electrode.

* * * * *